United States Patent
Illg et al.

(10) Patent No.: US 7,349,904 B2
(45) Date of Patent: Mar. 25, 2008

(54) METHOD AND APPARATUS FOR MANAGING ACCESS TO SET OF CONVERGED ENTITLEMENT RESOURCES

(75) Inventors: Jason J. Illg, Rochester, MN (US); Sean Todd Murray, Marietta, GA (US); John Mailan Pisello, Rutledge, GA (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/932,729

(22) Filed: Sep. 2, 2004

(65) Prior Publication Data
US 2006/0059155 A1    Mar. 16, 2006

(51) Int. Cl.
G06F 17/30    (2006.01)
(52) U.S. Cl. .............................................. 707/9; 707/3
(58) Field of Classification Search ................ 707/3–5, 707/1, 9, 10, 200; 709/220, 227
See application file for complete search history.

(56) References Cited

U.S. PATENT DOCUMENTS

| 6,654,745 | B2 * | 11/2003 | Feldman | 707/9 |
| 6,871,232 | B2 * | 3/2005 | Curie et al. | 709/225 |
| 7,225,223 | B1 * | 5/2007 | McCarthy et al. | 709/204 |
| 2004/0093502 | A1 * | 5/2004 | Shurygailo et al. | 713/183 |
| 2004/0117790 | A1 * | 6/2004 | Rhine | 718/100 |
| 2004/0128297 | A1 * | 7/2004 | Moses et al. | 707/100 |
| 2005/0125521 | A1 * | 6/2005 | Grimm et al. | 709/223 |
| 2005/0210262 | A1 * | 9/2005 | Rolia et al. | 713/182 |

* cited by examiner

Primary Examiner—Cheryl Lewis
(74) Attorney, Agent, or Firm—James R. Nock

(57) ABSTRACT

A method, apparatus and program-product are provided for managing user access to a converged set of entitlement resources residing within an entitlement resource repository. Each of the entitlement resources is marked with an entitlement identifier. When a requester attempts to access an entitlement resource, an authentication token corresponding to the requester is sent to one or more entitlement authorities associated with the entitlement resource. The entitlement authority creates a set of entitlement identifiers associated with the requestor. This set of entitlement identifiers associated with the requestor is then compared with the entitlement identifiers associated with the entitlement resource to determine if the requestor has authority to access the entitlement resource.

28 Claims, 7 Drawing Sheets

METHOD AND APPARATUS FOR MANAGING ACCESS TO SET OF CONVERGED ENTITLEMENT RESOURCES

FIELD OF THE INVENTION

The present invention relates generally to managing access to a variety of documents and applications, and more specifically to converging entitlement resources from a plurality of entitlement resource repositories to a single entitlement resource repository.

BACKGROUND OF THE INVENTION

One of the biggest challenges facing many web-based organizations today is the daunting task of organizing enterprise entitlement resources (e.g., technical documents, problem reporting functions, user forums, discussion databases, etc.) in a meaningful way, such that customers can easily find what they need. As an example, IBM Corporation alone has over 2.5 million Internet pages, and more technical content than any single entity, including the Pentagon.

As a result, enterprises have begun to develop advanced information search and delivery systems that not only enable customers to find what they are looking for, but also enable customers to realize value in the information they find. One example of such a system is DigitalBlue (dBlue), which is a digital interface between IBM Corporation and its customers. dBlue enables customers to search for IBM technical support information using natural language and produces results that are categorized, prioritized and personalized.

The dBlue architecture connects three important elements from the information search world—information sources, search engines, and end users—on the basis of IBM's WebSphere software platform. This is done through a series of components called the "Knowledge Builder". Information sources are data sources such as document repositories, DB2 and Lotus Notes databases, Web sites, etc. Search engines are programs that can index content and enable searching of the indexed data. End users access dBlue through a front-end interface; the current default interface is a Web interface. The content is extracted from information sources using the Document Extractor and mapped to a unified XML Schema, then it is processed by the Document Processor and stored in the Knowledge Repository.

FIG. 1 presents a high-level block diagram of the IBM dBlue system architecture, shown generally at 100. When a user accesses the dBlue system and submits a search query, the Query Manager processes the query, along with all of the submitted parameters. The Query Builder then collects the query and parameters submitted by the user, along with information coming from the user's profile and the system configuration, to build a standard Query object. The object is submitted to the search engine through the Search Engine Adapter. The search results flow back to the user through the Search Engine Adapter, the Search Query Manager, and the View Builder. The View Builder uses the Remote Site Customization component and data to construct a personalized view of the search hit list. When the user requests a view of a specific document, the request is processed by the View Builder, which accesses the Knowledge Repository to get the document content and builds a coherent document view.

Currently, DBlue contains technical information from many different web sites, with different ways of entitling (i.e., authorizing) customers to the technical information based on the contracts the customer has purchased from the company/site. If these different web sites wanted to converge all of their technical documents onto a single entitlement repository, they would need to determine how to entitle the right customers. Currently, there is no known way to solve this problem except to not move the entitled content to a single entitlement repository, but leave the information at the disparate web sites. This is a major drawback, in that companies cannot realize the cost savings associated with having their entitled content managed from a single entitlement repository. A single entitlement repository for entitled content can also promote synergy between companies sharing the entitlement repository.

There is a need for a method, apparatus and computer program product to converge entitlement resources from a plurality of entitlement resource repositories to a single entitlement resource repository. The entitlement resources should include not only technical documents, but also problem reporting functions, user forums, discussion databases, fix delivery solutions, tools, software download delivery resources, software upgrades, etc.

SUMMARY OF THE INVENTION

In one embodiment of the present invention, a method is provided for managing a set of entitlement resources. The method begins by converging the set of entitlement resources from multiple entitlement resource repositories onto a single, converged entitlement resource repository. Next, each of the converged entitlement resources within the converged entitlement resource repository is marked with one or more entitlement identifiers. An entitlement request from a requestor to access one or more of the entitlement resources residing within the entitlement resource repository is then received. An authentication token corresponding to the requestor is then passed to one or more entitlement authorities associated with each of the one or more requested entitlement resources. Next, a set of entitlement identifiers associated with the authentication token is created at the entitlement authorities, and if any such entitlement identifiers exist, the set of entitlement identifiers is returned to the entitlement resource repository. Finally, it is determined if the requestor has access to the requested entitlement resources by comparing the set of entitlement identifiers returned by the entitlement authorities with the entitlement identifiers associated with each of the requested entitlement resources.

In one embodiment, the method further includes the steps of: a) enabling requestor access to the requested entitlement resource if a match exists between the set of entitlement identifiers returned by the entitlement authorities and the entitlement identifiers associated with each of the requested entitlement solutions; and b) returning an informational message to the requestor if a match does not exist between the set of entitlement identifiers returned by the entitlement authorities and the entitlement identifiers associated with each of the requested entitlement resources. If such a match does not exist, the requester is then presented with an opportunity to obtain access to the desired entitlement resource. Entitlement solutions may include, but are not limited to: technical documents, problem reporting functions, user forums, discussion databases, fix delivery solutions, tools, software download delivery resources and software upgrades.

In one embodiment, the method may further include the step of marking each of the converged entitlement resources with an entitlement type, wherein the entitlement type determines which of the one or more entitlement authorities are passed authentication tokens.

The present invention also provides an apparatus for managing a set of entitlement resources. The apparatus includes an entitlement resource repository having a set of merged entitlement resources. The apparatus also includes a user workstation coupled to the entitlement resource repository, wherein the user workstation issues an entitlement request to access one or more entitlement resources within the entitlement resource repository, and receives the results of the entitlement request from the entitlement resource repository. The apparatus further includes one or more entitlement authorities coupled to the entitlement resource repository, wherein the entitlement authorities determine whether an issuer of the entitlement request has authority to access the one or more requested entitlement resources residing within the entitlement resource repository.

Each of the set of merged entitlement resource may include an entitlement identifier and/or an entitlement type. In one embodiment, the entitlement resource repository includes an authentication module for assigning an authentication token to the issuer of the entitlement request, and passing the authentication token to the entitlement authorities. The entitlement authorities may include an entitlement identification creator for creating a set of entitlement identifiers corresponding to the passed authentication token, and passing the set of entitlement identifiers back to the entitlement resource repository. The document repository may include a comparator to determine if the issuer of the entitlement request has access to the requested entitlement solutions by comparing the set of entitlement identifiers returned by the entitlement authorities with the entitlement identifiers associated with each of the issuer requested entitlement resources.

In another embodiment of the apparatus for managing a set of entitlement resources, the apparatus includes an entitlement resource repository having a set of merged entitlement resources. The apparatus further includes a user workstation coupled to the entitlement resource repository, wherein the user workstation issues an entitlement request to access one or more entitlement resources within the entitlement resource repository. The apparatus further includes a session entitlement broker (SEB) coupled to the entitlement resource repository, the SEB receiving the entitlement request from the user workstation and determining whether the issuer of the entitlement request has authority to access the requested entitlement resource. Finally, the apparatus includes one or more entitlement authorities coupled to the SEB, wherein the entitlement authorities assign a set of entitlement identifiers associated with the issuer of the entitlement request, then returns the set of entitlement identifiers to the SEB.

The foregoing and other features and advantages of the invention will be apparent from the following more particular description of preferred embodiments of the invention, as illustrated in the accompanying drawings.

DETAILED DESCRIPTION OF THE PREFERRED EMBODIMENTS

The present invention provides a method, apparatus and program product for managing user access to a converged set of entitlement resources residing within an entitlement resource repository. Each of the entitlement resources is marked with an entitlement identifier. When a requester (e.g., user) attempts to access an entitlement resource, an authentication token corresponding to the requestor is sent to one or more entitlement authorities associated with the entitlement resource. The entitlement authority creates a set of entitlement identifiers associated with the requestor. This set of entitlement identifiers associated with the requestor is then compared with the entitlement identifiers associated with the entitlement resource to determine if the requestor has authority to access the entitlement resource.

Figure 1A:
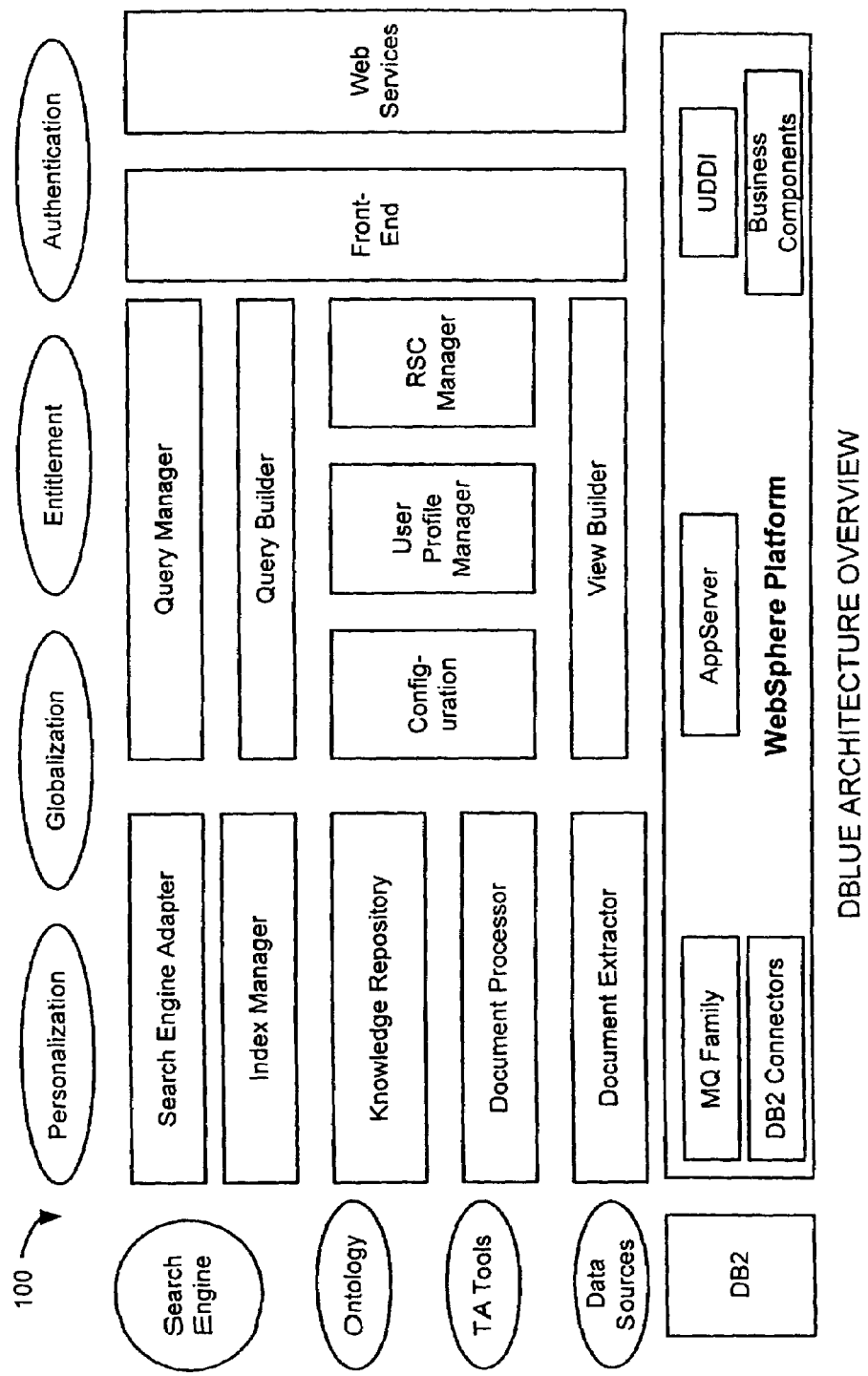
FIG. 1A (Prior Art) illustrates a high-level block diagram of the IBM dBlue system architecture in accordance with the present invention.
Figure 2:
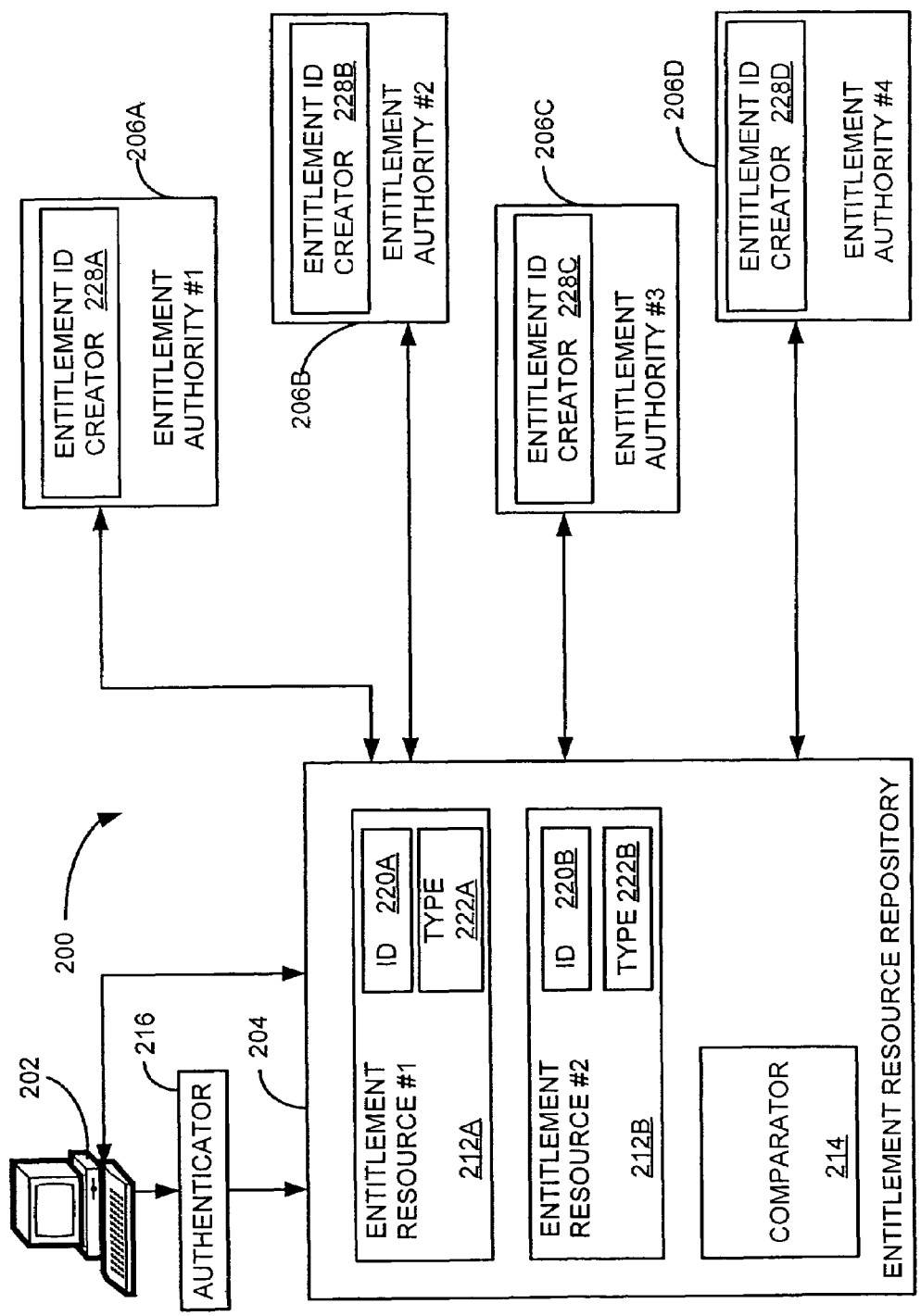
FIG. 2 illustrates a first embodiment of an apparatus/system for managing a set of entitlement resources in accordance with the present invention.

Turning to the Drawings, wherein like numbers denote like parts throughout the several views, FIG. 2 illustrates one embodiment of an apparatus/system for managing a set of entitlement resources in accordance with the present invention, shown generally at 200. The apparatus/system 200 includes an entitlement resource repository 204, where a set of entitlement resources (e.g., 212A and 212B) from multiple entitlement authorities are converged. Entitlement resources 212A, 212B may include, but are not limited to: technical documents, problem reporting functions, user forums, discussion databases, fix delivery solutions, tools, software download delivery resources, software upgrades, etc. In one embodiment of the present invention, entitlement solution repository 204 is a central database on a single computer server.

A user workstation 202 is coupled to entitlement resource repository 204, enabling a requestor to access the set of entitlement resources 212A and 212B residing within entitlement resource repository 204. In the illustrated embodiment, a requester (e.g., user) will generally be authenticated to the entitlement resource repository via authentication module 216, thus establishing an authentication token associated with the requestor. A requester, in the context of the present invention, may also include any type of entity (e.g., users, systems, websites, etc.) which may request access to the entitlement resource repository. A set of entitlement authorities 206A, 206B, 206C and 206D are also coupled to entitlement resource repository 204. The entitlement authorities 206A, 206B, 206C and 206D are the entitlement providers for the converged entitlement resources 212A, 212B found on the entitlement resource repository 204. Entitlement authorities 206A, 206B, 206C and 206D further determine whether a specific requestor (via the authentication token established at the entitlement resource repository 204) has authority (i.e., is entitled) to access a particular entitlement resource 212A and 212B.

Each of the converged entitlement resources 212A and 212B residing within the entitlement resource repository 204 is marked with one or more entitlement identifiers, 220A and 220B, respectively. The entitlement identifier 220A, 220B is a credential which establishes which set of requestors are entitled to access a particular entitlement resource. In one embodiment of the present invention, each entitlement resource 212A and 212B may further include an entitlement type, 222A and 222B, respectively. The entitlement type 222A, 222B determines which of the entitlement authorities 206A-206D are passed authentication tokens. By way of example, if an entitlement type 222A, 222B of "general" is assigned to a particular entitlement resource 212A, 212B, the entire set of entitlement authorities 206A-206D are passed authentication tokens. This is done because "general" entitlement indicates that the entitlement solution 212A, 212B is available to any requestor who has purchased any kind of support contract with the company supplying the entitlement resource. Thus, all entitlement authorities for that specific company must be checked to determine requestor credentials. If an entitlement type 222A, 222B of "specific" is assigned to a particular entitlement resource 212A, 212B, only the particular entitlement authority in the set 206A-206D that published that entitlement resource is checked to see if the requestor is entitled to access the entitlement resource, since only that specific entitlement authority can authorize the requestor to that particular entitlement resource.

There are many other potential entitlement types 222A, 222B that may be employed within the present invention, and still remain within the spirit and scope of the present invention. For example, other potential types of entitlement types include, but are not limited to: product entitlement (available to anyone who has the proper product entitlement code returned from an entitlement authority), free entitlement (available to everyone), and internal entitlement (available only to employees of the entitlement provider).

In the illustrated embodiment, each entitlement authority 206A-206D includes an entitlement identifier creator 228A-228D. The entitlement identifier creator 228A-228D analyzes the authentication token passed by entitlement resource repository 204 to determine what credentials are available for that particular requestor. A set of credentials (i.e., entitlement identifiers) associated with the requestor (i.e., via the passed authentication token) is then created by the entitlement identifier creator 228A-228D, and passed back to the entitlement resource repository 204. The passed set of entitlement identifiers is then compared against the entitlement identifier 220A, 220B associated with each entitlement resource selected for access by the requestor to determine if the requestor has authority to access the selected entitlement resource. This comparison is performed by comparator 214. If there is a positive match identified by comparator 214 for a particular entitlement resource 212A-212B selected by the requester, the requestor is then provided access to the selected entitlement resource. In one embodiment of the present invention, if comparator 214 determines that a requestor does not have access authority to a particular entitlement resource 212A-212B, the entitlement resource repository 204 then directs the requester to a entitlement resource access enablement interface (not shown), where the requestor has the opportunity to obtain access to the desired entitlement resource 212A-212B. The entitlement resource access enablement interface may offer a variety of ways for a user to access the entitlement resources, including but not limited to, purchasing a support contract, registering for access, etc.

Figure 3:
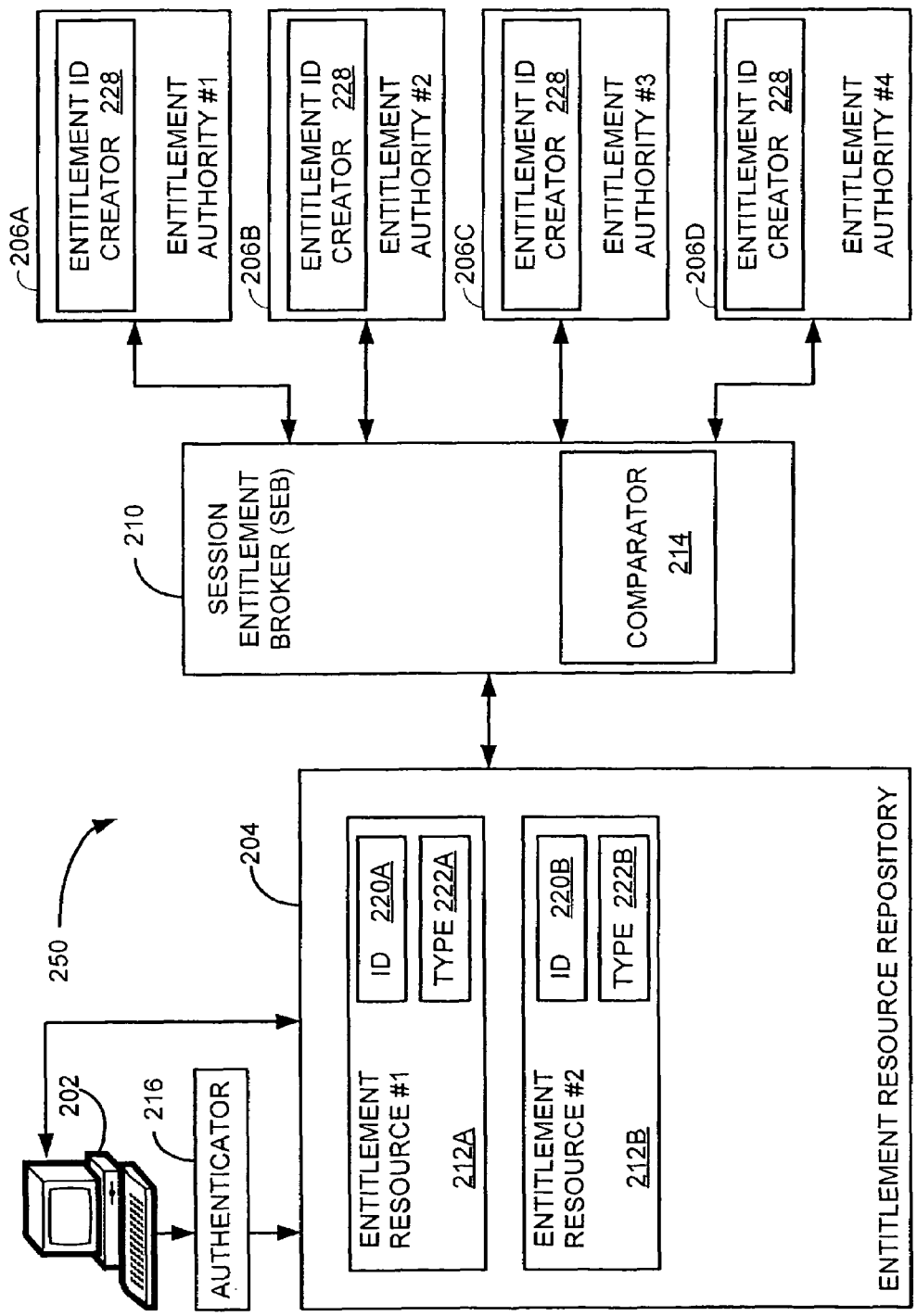
FIG. 3 illustrates a second embodiment of an apparatus/system for managing a set of entitlement resources in accordance with the present invention.

FIG. 3 is another embodiment of an apparatus/system for managing a set of entitlement resources in accordance with the present invention, shown generally at 250. In this embodiment, a session entitlement broker (SEB) 210 is placed between the entitlement resource repository 204 and each of the entitlement authorities 206A-206D. In an example scenario, the SEB 210 receives the following from the entitlement resource repository 204: 1) the entitlement resource(s) 212A, 212B (along with the associated entitlement identifiers 220A-220B, and entitlement types 222A-222B) that the requestor wishes to access; and 2) an authentication token from authentication module 216 identifying the requester that is attempting to access the entitlement resources. The SEB 210 passes this information to the appropriate set of entitlement authorities 206A-206D, based on the entitlement type 222A-222B associated with the entitlement resource 212A-212B that the requestor is attempting to access (i.e., whether the entitlement resource is generally enabled, specifically enabled, etc.). The entitlement authorities 206A-206D then return to the SEB 210 a set of entitlement identifiers associated with the authentication token.

The SEB 210 then compares the entitlement identifiers returned by the entitlement authorities 206A-206D against the set of entitlement identifiers 220A-220B associated with the entitlement resources that the requestor has selected to access. This is done by comparator 214. If there is a positive match identified by comparator 214 for a particular entitlement resource 212A-212B selected by the requestor, the requestor is then provided access to the selected entitlement resource. In one embodiment of the present invention, if comparator 214 determines that a requestor does not have access authority to a particular entitlement resource 212A-212B, the entitlement resource repository 204 then directs the requestor to a entitlement resource access enablement interface (not shown), where the requestor has the opportunity to obtain access to the desired entitlement resource 212A-212B. The entitlement resource access enablement interface may offer a variety of ways for a user to access the entitlement resources, including but not limited to, purchasing a support contract, registering for access, etc.

Figure 4:
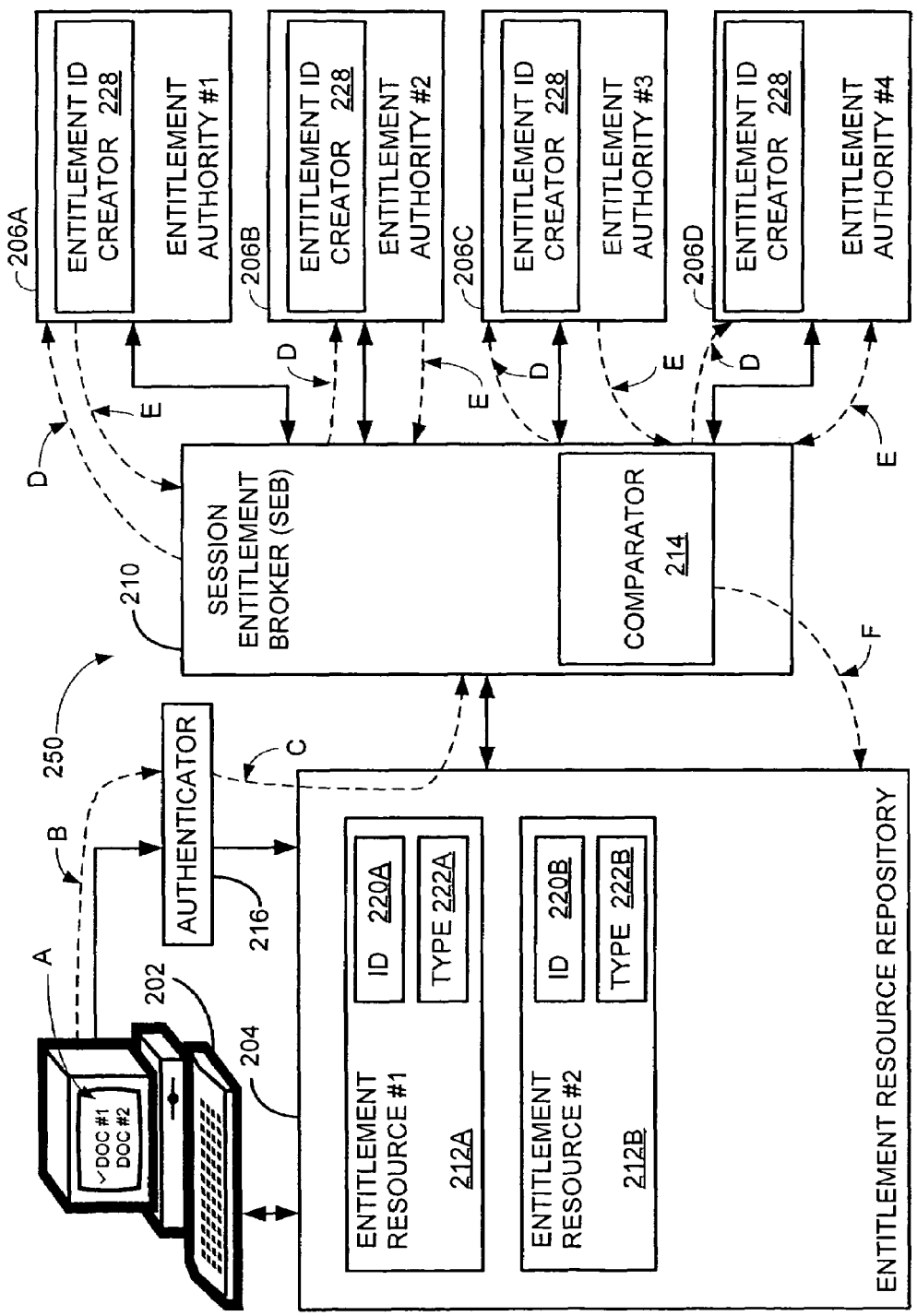
FIG. 4 illustrates an exemplary process flow for granting a requestor access to a generally entitled entitlement resource where the requestor has been determined to be entitled, the process flow superimposed over the second embodiment of an apparatus/system for managing a set of entitlement resources, shown previously in FIG. 3.

FIG. 4 illustrates an exemplary process flow for granting a requestor access to a generally entitled entitlement resource, the process flow superimposed over the second embodiment of an apparatus/system for managing a set of entitlement resources, shown previously in FIG. 3. In the illustrated process flow, the requestor is found to be entitled to access the selected entitlement resource.

At process step A, a requestor selects an entitlement resource (e.g., document) to access at the user workstation 202. In this instance, the entitlement resource 212A desired by the requestor has an entitlement type 222A of "general". Since generally entitled user resources require user registration to access, the requestor is next directed to an authentication module 216 (e.g., sign-on screen), where an authentication token is established if the requester is registered, as shown at step B. In step C, if the requester is registered, the registration information is sent to the SEB 210. If the requester is not registered, the requester can pursue registration from the appropriate registration site (not shown) then navigate back to the search results screen (e.g., by pushing the back button on their browser).

In step D, since the entitlement resource desired by the requester has been marked as generally entitled (via entitlement type 222), the SEB 210 calls all entitlement authorities 206, passing the authentication token established at requestor authentication. Each entitlement authority 206 then determines what authority the requester has, and passes the entitlement identifier back to the SEB 210, as shown at step E. The SEB 210 then compares the entitlement identifiers returned by the entitlement authorities 206 against the set of entitlement identifiers 220 associated with the entitlement resources 212 that the requester has selected to access. In this instance, the requester has been determined by the SEB 210 to have been entitled to the selected entitlement resource, thus the selected entitlement resource 212 is made available to the requester.

Figure 5:
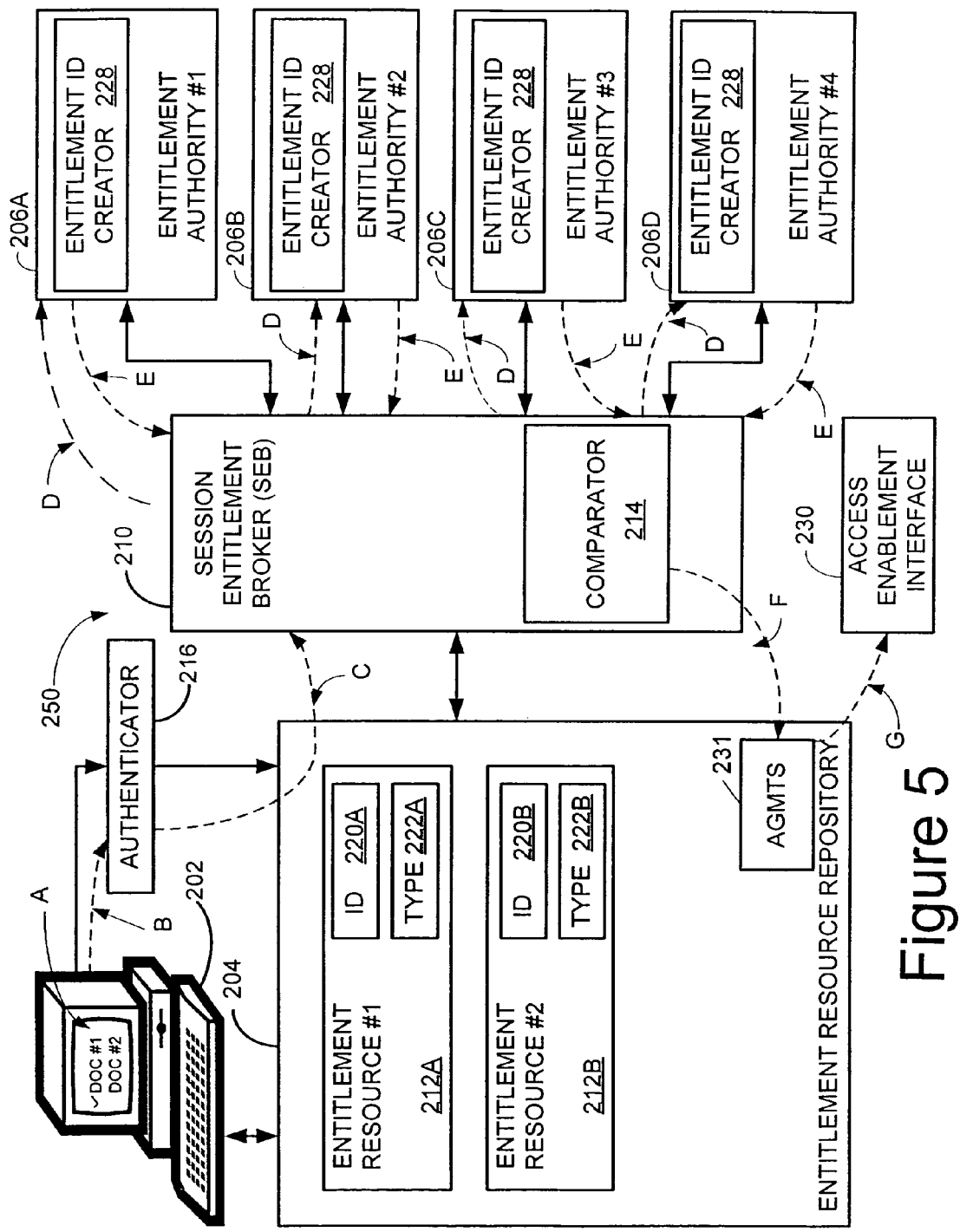
FIG. 5 illustrates an exemplary process flow for denying a requestor access to a generally entitled entitlement solution where the requestor has been determined not to be entitled, the process flow superimposed over the second embodiment of an apparatus/system for managing a set of entitlement resources, shown previously in FIG. 3.

FIG. 5 illustrates an exemplary process flow for checking whether a requester has access to a requested entitlement resource, the process flow superimposed over the second embodiment of an apparatus/system for managing a set of entitlement resources, shown previously in FIG. 3. In contrast to FIG. 4, in this scenario, the requester is found to be not generally entitled to access the selected entitlement resource.

At process step A, a user selects an entitlement resource (e.g., document) to access at the user workstation 202. In this instance, the entitlement solution 212 desired by the requester has an entitlement type 222A of "general". Since generally entitled entitlement resources require user registration to access, the requester is next directed to an authentication module 216, where an authentication token is established, if the requestor is registered, as shown at step B. In step C, if the requester is registered, the registration information is sent to the SEB 210. If the requester is not registered, the requester can pursue registration from the appropriate registration site (not shown) then navigate back to the search results screen (e.g., by pushing the back button on their browser).

In step D, since the entitlement resource desired by the requester has been marked as generally entitled (via entitlement type 222), the SEB 210 calls all entitlement authorities 206, passing the authentication token established at requestor authentication. Each entitlement authority 206 then determines what authority the requester has, and passes the entitlement identifier back to the SEB 210, as shown at step E. The SEB 210 then compares the entitlement identifiers returned by the entitlement authorities 206 against the set of entitlement identifiers 220 associated with the entitlement resources 212 that the requester has selected to access. In this instance, the requester has been determined by the SEB to not be entitled to the selected entitlement resource. In this instance, the requester is then shown a page listing the user's currently active agreements 213, shown at step F.

At step G, requesters are then directed to an entitlement resource access enablement interface 230, where the requester has the opportunity to obtain access to the desired entitlement resource 212A-212B. The entitlement resource access enablement interface 230 offers a variety of ways for a requester to access the entitlement resources, including but not limited to, purchasing a support contract, registering for access, etc. In one embodiment of the present invention, the entitlement resource access enablement interface 230 utilizes the entitlement identifier passed from the entitlement resource repository to present the requester with one or more potential opportunities to grant access to the requested entitlement resource.

Figure 6:
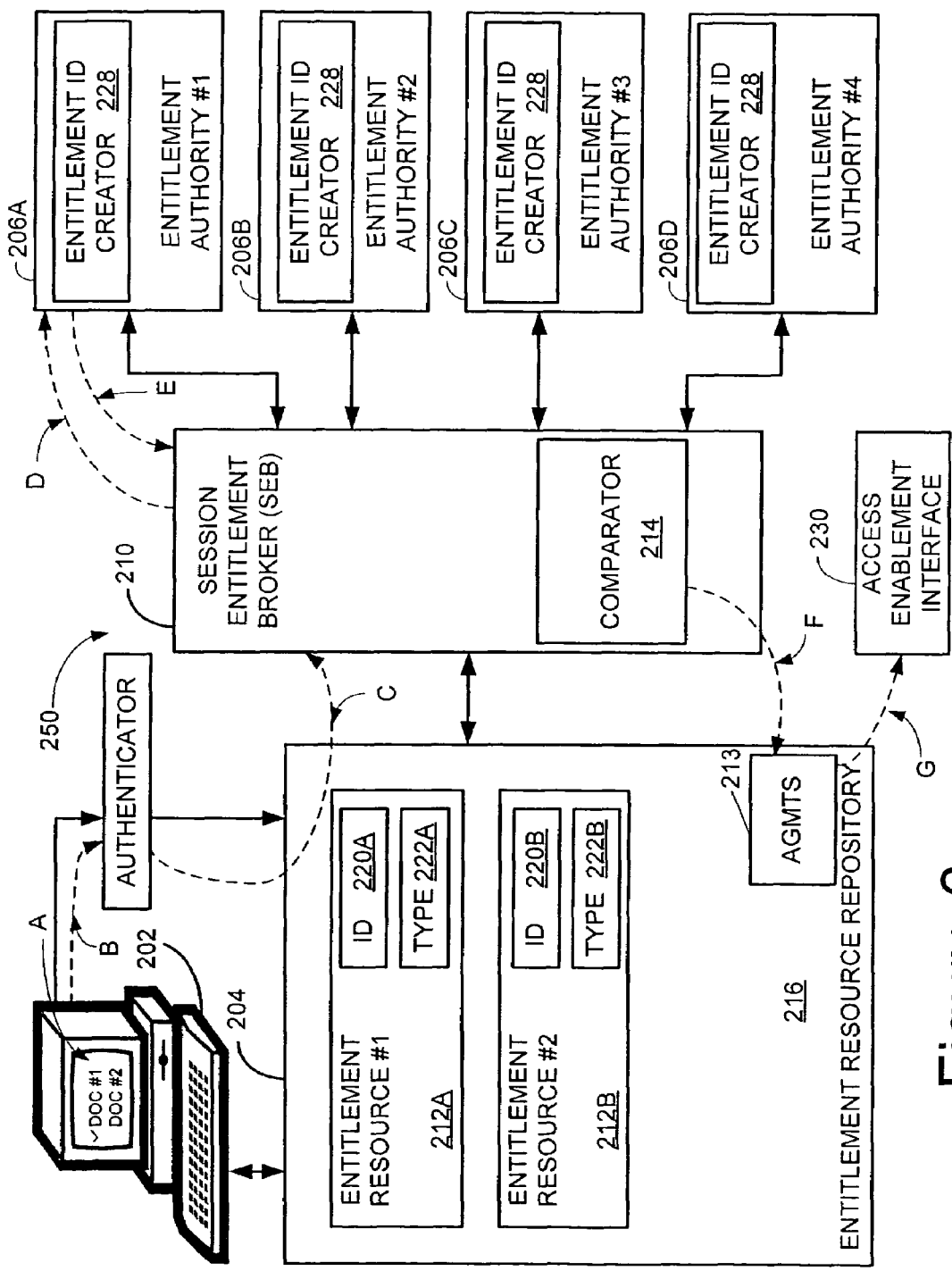
FIG. 6 illustrates an exemplary process flow for determining whether a requestor has authority to access to a specific entitlement resource, the process flow superimposed over the second embodiment of an apparatus/system for managing a set of entitlement resources, shown previously in FIG. 3.

FIG. 6 illustrates an exemplary process flow for determining whether a requester has authority to access to a specific entitlement resource, the process flow superimposed over the second embodiment of an apparatus/system for managing a set of entitlement resources, shown previously in FIG. 3.

At process step A, a requester selects an entitlement resource (e.g., document) to access at the user workstation 202. In this instance, the entitlement resource 212 desired by the requester has an entitlement type 222A of "specific". Since specific entitlement resources require user registration to access, the requester is next directed to an authentication module 216, where an authentication token is established, if the requester is registered, as shown at step B. In step C, if the requester is registered, the registration information is sent to the SEB 210. If the requester is not registered, the requester can pursue registration from the appropriate registration site (not shown) then navigate back to the search results screen (e.g., by pushing the back button on their browser).

In step D, since the entitlement resource desired by the requester has been marked as having "specific" entitlement (via entitlement type 222), the SEB 210 calls only the entitlement authority that authored the document (e.g., element 206A), passing the authentication token established at requestor authentication. Entitlement authority 206A then determines what authority the requester has, and passes the entitlement identifier back to the SEB 210, as shown at step E. The SEB 210 then compares the entitlement identifiers returned by the entitlement authority 206A against the set of entitlement identifiers 220 associated with the entitlement resources 212 that the requester has selected to access. If the requester has been determined by the SEB 210 to have been entitled to the selected entitlement resource, the entitlement resource 212 is made available to the requester. However, if the requester has been determined by the SEB 210 to not be entitled to the selected entitlement resource, the requester is then shown a page listing the requester's currently active agreements 213, shown at step F.

At step G, users are then directed to an entitlement resource access enablement interface 230, where the requester has the opportunity to obtain access to the desired entitlement resource 212A-212B. The entitlement resource access enablement interface 230 offers a variety of ways for a user to access the entitlement resources, including but not limited to, purchasing a support contract, registering for access, etc. In one embodiment of the present invention, the entitlement resource access enablement interface 230 utilizes the entitlement identifier passed from the entitlement resource repository to present the user with one or more potential opportunities to grant access to the requested entitlement resource.

Figure 7:
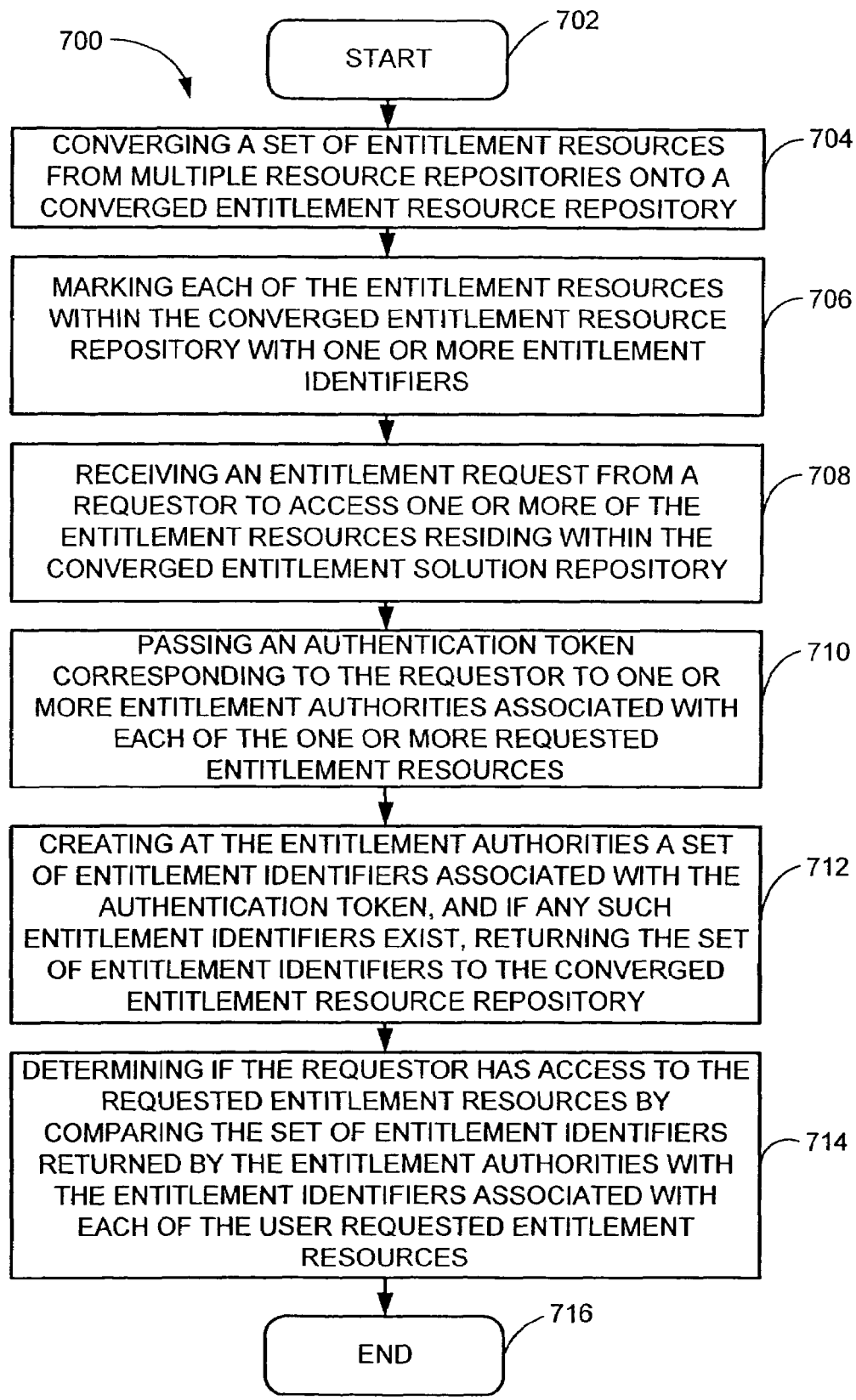
FIG. 7 is a flow diagram representing a method for managing a set of entitlement resources in accordance with the present invention.

FIG. 7 is a flow diagram representing a method for managing a set of entitlement resources in accordance with the present invention, shown generally at 700. The method begins at block 702. At block 704, a set of entitlement resources from multiple resource repositories are converged onto a single entitlement resource repository. At block 706, each of the converged entitlement resources residing within the entitlement resource repository is marked with one or more entitlement identifiers.

At block 708, an entitlement request is received from a requester to access one or more of the entitlement resources residing within the entitlement resource repository. At block 710, an authentication token corresponding to the requestor is passed to the entitlement authorities associated with each of the one or more requested entitlement resources. At block 712, a set of entitlement identifiers associated with the authentication token is created, and if any such entitlement identifiers exist, the set of entitlement identifiers is returned to the entitlement resource repository. At block 714, it is determined if the requestor has access to the requested entitlement resources by comparing the set of entitlement identifiers returned by the entitlement authorities with the entitlement identifiers associated with each of the requested entitlement resources. At block 716, the method ends.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a communications medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

Embodiments of the present invention may also be delivered as part of a service engagement with a client company, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

The invention in its broader aspects is therefore not limited to the specific details, representative apparatus and method, and illustrative examples shown and described. Accordingly, departures may be made from such details without departing from the spirit or scope of applicants' general inventive concept. It is intended that the scope of the present invention be limited not by this detailed description, but rather by the claims appended hereto. Therefore, the invention lies in the claims hereinafter appended.

The invention claimed is:

1. A computer implemented method for managing a set of entitlement resources, the method comprising the steps of:

converging the set of entitlement resources from multiple entitlement resource repositories onto a converged entitlement resource repository;

marking each of the entitlement solutions within the converged entitlement resource repository with one or more entitlement identifiers;

receiving an entitlement request from a requestor to access one or more of the entitlement resources residing within the converged entitlement resource repository;

passing an authentication token corresponding to the requestor to one or more entitlement authorities associated with each of the one or more requested entitlement resources;

creating at the entitlement authorities a set of entitlement identifiers associated with the authentication token, and if any such entitlement identifiers exist, returning the set of entitlement identifiers to the converged entitlement resource repository; and determining if the requestor has access to the requested entitlement resources by comparing the set of entitlement identifiers returned by the entitlement authorities with the entitlement identifiers associated with each of the user requested entitlement resources.

2. The method of claim 1, wherein the method further comprises the steps of:

enabling user access to the requested entitlement resource if a match exists between the set of entitlement identifiers returned by the entitlement authorities and the entitlement identifiers associated with each of the requested entitlement resources; and returning an informational message to the requestor if a match does not exist between the set of entitlement identifiers returned by the entitlement authorities and the entitlement identifiers associated with each of the requested entitlement resources.

3. The method of claim 2, wherein the step of returning an informational message to the requestor if a match does not exist between the set of entitlement identifiers returned by the entitlement authorities and the entitlement identifiers associated with each of the requested entitlement resources further comprises the step of:

presenting the requestor with an opportunity to obtain access to the requested entitlement resources.

4. The method of claim 3, wherein the step of presenting the requestor with an opportunity to obtain access to the requested entitlement resources includes offering the requestor the opportunity to buy a support package that will enable the requestor to access the requested entitlement resources.

5. The method of claim 3, wherein the step of presenting the requestor with an opportunity to obtain access to the requested entitlement resources includes offering the requestor the opportunity to register to obtain access to the requested entitlement resources.

6. The method of claim 1, wherein the entitlement resources comprise documents.

7. The method of claim 1, wherein the entitlement resources comprise problem reporting functions.

8. The method of claim 1, wherein the entitlement resources comprise user forums.

9. The method of claim 1, wherein the entitlement resources comprise discussion databases.

10. The method of claim 1, wherein the entitlement resources comprise fix delivery resources.

11. The method of claim 1, wherein the entitlement resources comprise tools.

12. The method of claim 1, wherein the entitlement resources comprise software download delivery resources.

13. The method of claim 1, wherein the entitlement resources comprise software upgrades.

14. The method of claim 1, wherein the method further comprises the step of marking each of the converged entitlement resources with an entitlement type, wherein the entitlement type determines which of the one or more entitlement authorities are passed authentication tokens.

15. A computer implemented apparatus for managing a set of entitlement resources, the apparatus comprising:
   an entitlement resource repository comprising a set of merged entitlement resources; wherein the entitlement resource repository includes an authentication module for assigning an authentication token to the issuer of the entitlement request, and passing the authentication token to the one or more entitlement authorities;
   a user workstation coupled to the entitlement resource repository, wherein the user workstation issues an entitlement request to access one or more entitlement resources within the entitlement resource repository, and receives the results of the entitlement request from the entitlement resource repository;
   one or more entitlement authorities coupled to the entitlement resource repository, wherein the entitlement authorities determine whether an issuer of the entitlement request has authority to access the one or more requested entitlement resources residing within the entitlement resource repository; and
   wherein the one or more entitlement authorities includes an entitlement identification creator for creating a set of entitlement identifiers corresponding to the passed authentication token, and passing the set of entitlement identifiers back to the entitlement resource repository.

16. The apparatus of claim 15, wherein each of the set of merged entitlement resources includes an entitlement identifier.

17. The apparatus of claim 16, wherein each of the set of merged entitlement resources includes an entitlement type.

18. The apparatus of claim 15, wherein the document repository includes a comparator to determine if the issuer of the entitlement request has access to the requested entitlement resources by comparing the set of entitlement identifiers returned by the entitlement authorities with the entitlement identifiers associated with each of the issuer requested entitlement resources.

19. The apparatus of claim 15, wherein the SEB includes a comparator to determine if the issuer of the entitlement request has access to the requested entitlement resources by comparing the set of entitlement identifiers returned by the entitlement authorities with the entitlement identifiers associated with each of the requested entitlement resources.

20. A computer implemented apparatus for managing a set of entitlement resources, the apparatus comprising:
   an entitlement resource repository comprising a set of merged entitlement resources;
   a user workstation coupled to the entitlement resource repository, wherein the user workstation issues an entitlement request to access one or more entitlement resources within the entitlement resource repository;
   a session entitlement broker (SEB) coupled to the entitlement resource repository, the SEB receiving the entitlement request from the user workstation and determining whether the issuer of the entitlement request has authority to access the requested entitlement resource; and
   one or more entitlement authorities coupled to the SEB, wherein the entitlement authorities assign a set of entitlement identifiers associated with the issuer of the entitlement request, then return the set of entitlement identifiers to the SEB.

21. The apparatus of claim 20, wherein each of the set of merged entitlement resources includes an entitlement identifier.

22. The apparatus of claim 21, wherein each of the set of merged entitlement resources includes an entitlement type.

23. The apparatus of claim 20, wherein the entitlement resource repository includes an authentication module for assigning an authentication token to the issuer of the entitlement request, and passing the authentication token to the one or more entitlement authorities as part of the entitlement request.

24. The apparatus of claim 23, wherein the one or more entitlement authorities includes an entitlement identification creator for creating a set of entitlement identifiers corresponding to the passed authentication token, and passing the set of entitlement identifiers back to the SEB.

25. A computer implemented method for deploying computing infrastructure, comprising integrating computer-readable code into a computing system, wherein the code in combination with the computing system is capable of managing a set of entitlement resources converged from multiple entitlement resource repositories onto a converged entitlement resource repository, the method comprising the steps of:
   marking each of the entitlement resources within the converged entitlement resource repository with one or more entitlement identifiers;
   processing an entitlement request to access one or more of the entitlement resources residing within the entitlement resource repository;
   passing a request identifier associated with the entitlement request to one or more entitlement authorities associated with each of the one or more requested entitlement resources;
   creating at the entitlement authorities a set of entitlement identifiers associated with the request identifier, and if any such entitlement identifiers exist, returning the set of entitlement identifiers to the entitlement resource repository; and
   determining if the entitlement request has access to the requested entitlement resources by comparing the set of entitlement identifiers returned by the entitlement authorities with the entitlement identifiers associated with each of the requested entitlement resources.

26. A computer-readable program stored on a computer-readable storage medium, the computer readable program providing a method of managing a set of entitlement resources, the computer-readable program executed on a computer comprising the steps of:
   converging the set of entitlement resources from multiple entitlement resource repositories onto a converged entitlement resource repository;
   marking each of the entitlement resources residing within the converged entitlement resource repository with one or more entitlement identifiers;
   receiving an entitlement request from a requestor to access one or more of the entitlement resources residing within the converged entitlement resource repository;
   passing an authentication token corresponding to the requestor to one or more entitlement authorities associated with each of the one or more requested entitlement resources;

creating at the entitlement authorities a set of entitlement identifiers associated with the authentication token, and if any such entitlement identifiers exist, returning the set of entitlement identifiers to the converged entitlement resource repository; and determining if the requestor has access to the requested entitlement resources by comparing the set of entitlement identifiers returned by the entitlement authorities with the entitlement identifiers associated with each of the requested entitlement resources.

27. The computer-readable program of claim 26, wherein the method further comprises the steps of:

enabling requestor access to the requested entitlement resource if a match exists between the set of entitlement identifiers returned by the entitlement authorities and the entitlement identifiers associated with each of the requested entitlement resources; and returning an informational message to the requestor if a match does not exist between the set of entitlement identifiers returned by the entitlement authorities and the entitlement identifiers associated with each of the requested entitlement resources.

28. The computer-readable program of claim 27, wherein the step of returning an informational message to the requestor if a match does not exist between the set of entitlement identifiers returned by the entitlement authorities and the entitlement identifiers associated with each of the requested entitlement resources further comprises the step of:

presenting the requestor with an opportunity to obtain access to the requested entitlement resources.

* * * * *